Aug. 20, 1968   H. S. SHAW   3,397,800
CONVEYOR MEMORY SYSTEM

Filed May 27, 1966   3 Sheets-Sheet 1

INVENTOR
HERBERT S. SHAW, DECEASED,
BY SOPHIE L. SHAW,
ADMINISTRATRIX.

Knox & Knox

Aug. 20, 1968  H. S. SHAW  3,397,800
CONVEYOR MEMORY SYSTEM
Filed May 27, 1966  3 Sheets-Sheet 2
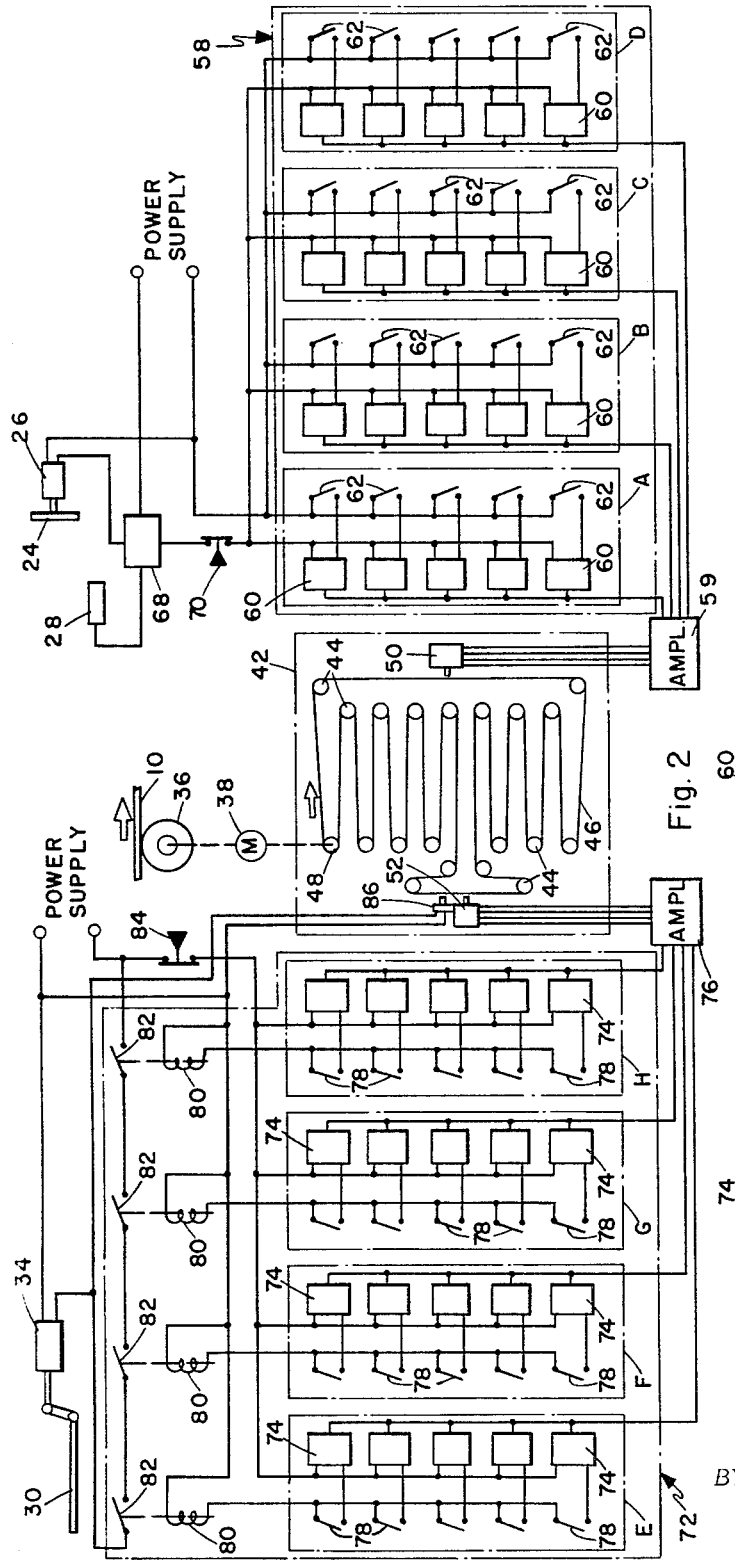
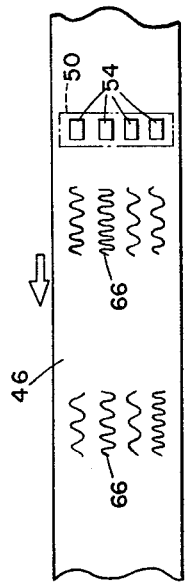
Fig. 4
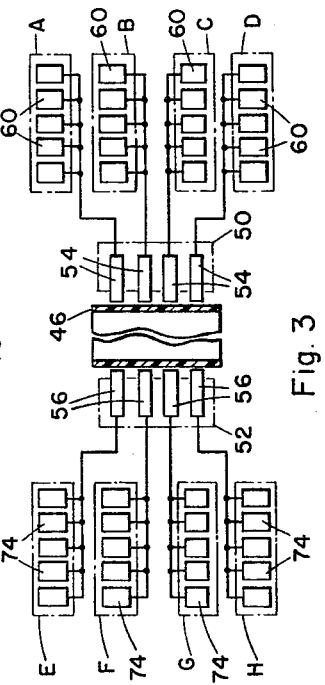
Fig. 3
Fig. 2
HERBERT S. SHAW, DECEASED,
BY SOPHIE L. SHAW,
ADMINISTRATRIX.
BY Knox & Knox Aug. 20, 1968　　　　　H. S. SHAW　　　　　3,397,800
CONVEYOR MEMORY SYSTEM
Filed May 27, 1966　　　　　　　　　　　　　3 Sheets-Sheet 3

INVENTOR
HERBERT S. SHAW, DECEASED,
BY SOPHIE L. SHAW, ADMINISTRATRIX.
BY
Knox & Knox

United States Patent Office 3,397,800
Patented Aug. 20, 1968

3,397,800
CONVEYOR MEMORY SYSTEM
Herbert S. Shaw, deceased, late of Whittier, Calif., by Sophie L. Shaw, administratrix, 5208 Rideout Way, Whittier, Calif. 90601
Filed May 27, 1966, Ser. No. 553,576
6 Claims. (Cl. 214—11)

ABSTRACT OF THE DISCLOSURE

An endless conveyor is coupled to a memory system having an endless recording element which is proportional in length to and moves in synchronization with the conveyor. Each article placed on the conveyor is identified by a predetermined code which is applied by a coding unit to the recording element in a position corresponding proportionally to the position of the article on the conveyor, so that the relative positions of each article and its identifying code remain in synchronization. To retrieve any article or group of similarly coded articles at any of a number of retrieval stations, the pertinent code is manually applied to a decoding unit and, when the selected article reaches the retrieval station, the coded signal carried by the recording element will actuate ejection means to remove the article from the conveyor.

---

Figure 1:
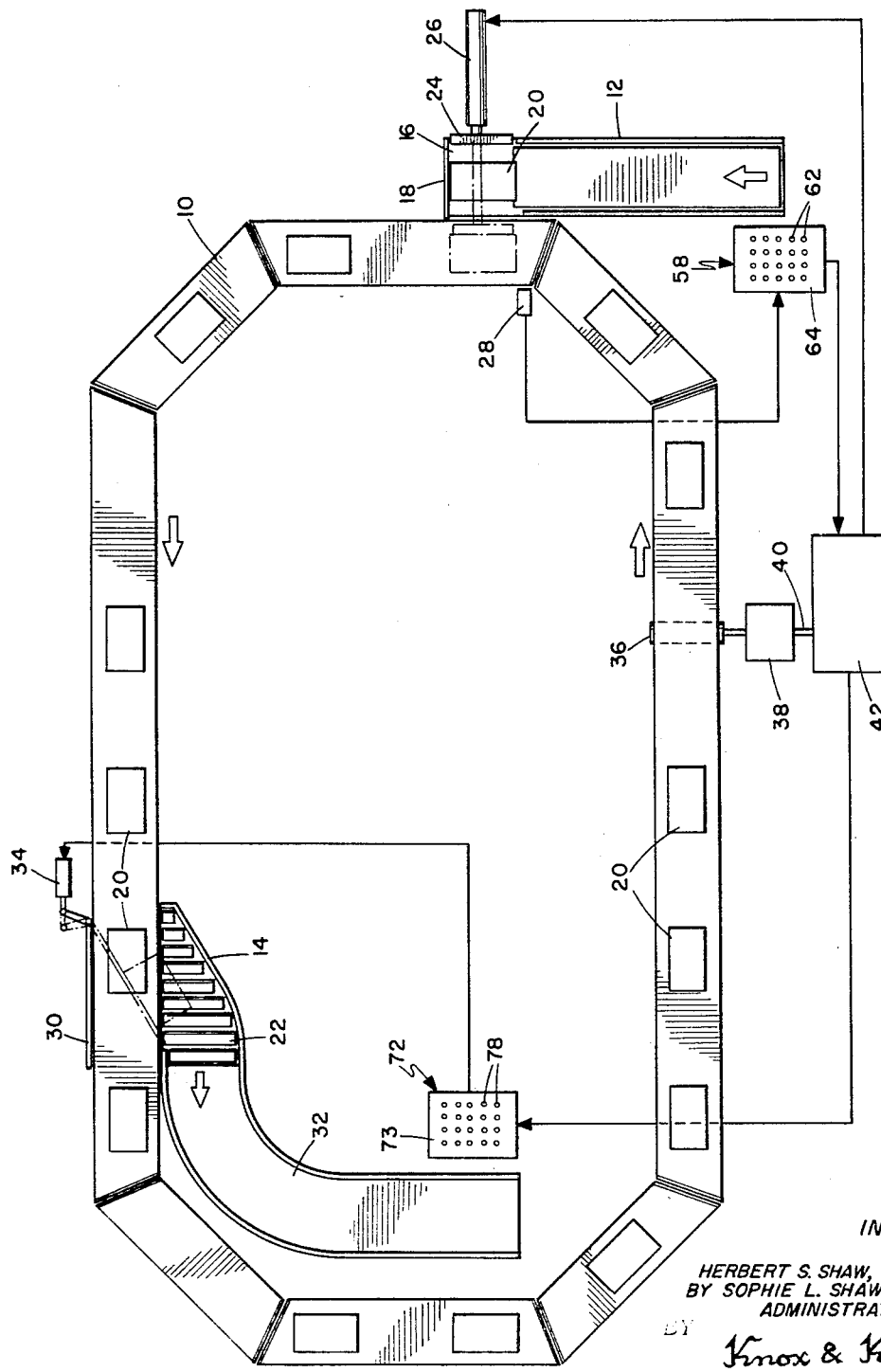

The present invention relates to material handling and specifically to a conveyor memory system.

The primary object of this invention is to provide a conveyor memory system which is synchronized with an endless conveyor to record the location of each and every article on the conveyor and enable any article to be removed automatically at a selected location.

Another object of this invention is to provide a conveyor memory system wherein each article on the conveyor is identified in the memory by a specific code, and single articles or groups of similar articles may be retrieved by selecting the required code.

Another object of this invention is to provide a conveyor memory system wherein the articles are entered and retrieved by use of manually selected encoding and decoding means, using a simple endless recording element which travels together with the conveyor and maintains the correct relationship of each article and its record, without the need for computers or other such complex means.

A further object of this invention is to provide a conveyor memory system which is adaptable to a variety of endless conveyors using belts, chains, overhead tracks, or other means, and which may be coupled to many existing conveyors with a minimum of modification.

Figure 5:
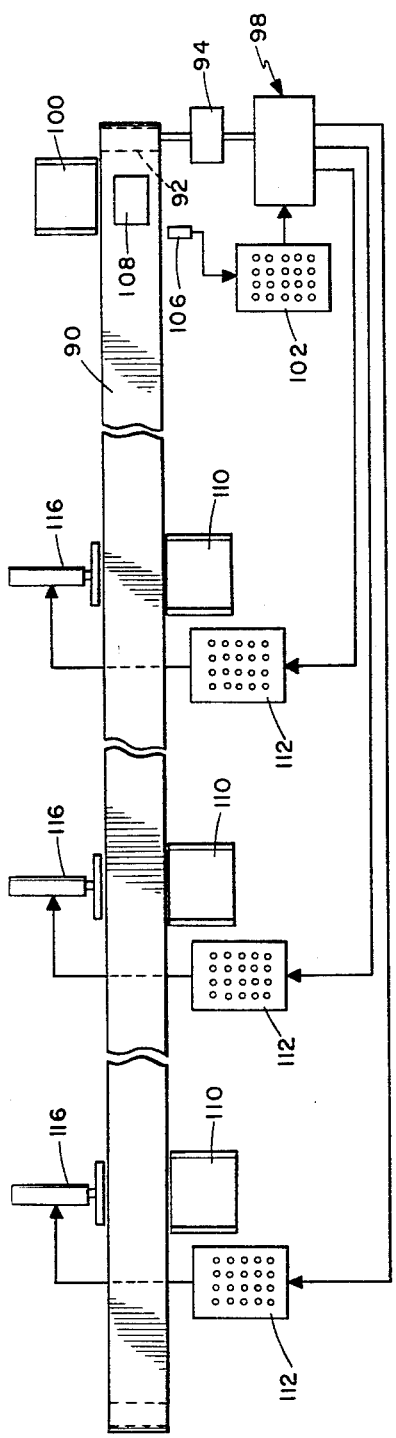
Figure 6:
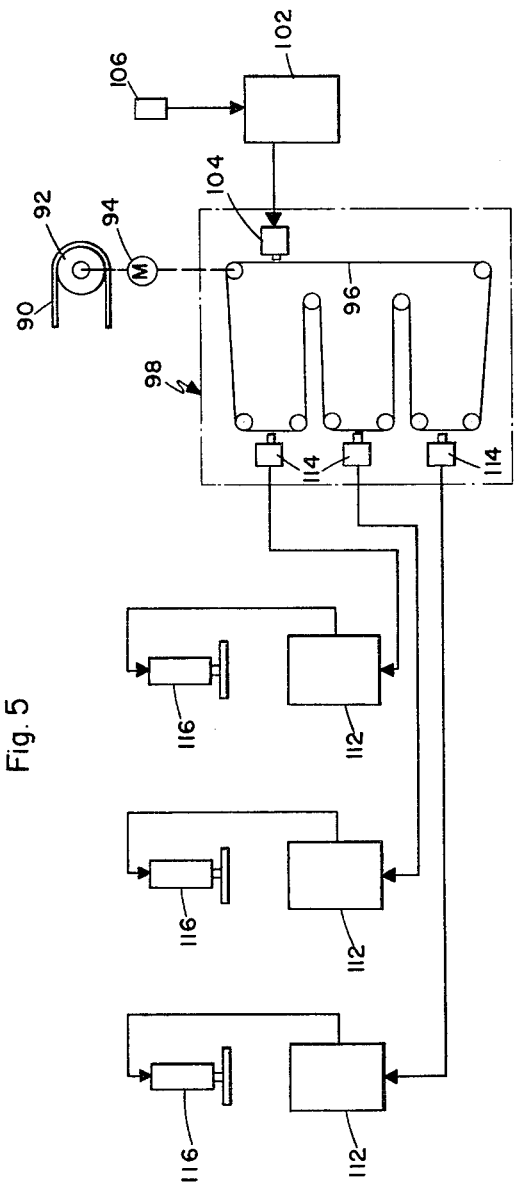

The system and its adaptation to conveyors are illustrated in the drawings, in which:

FIGURE 1 is a diagram of the system coupled to a closed circuit belt conveyor;
FIGURE 2 is a wiring diagram of the basic memory system and controls;
FIGURE 3 is a diagram of the multiple recording and pick-off head arrangement;
FIGURE 4 is a detail of a portion of the recording element with representations of the coded signals thereon;
FIGURE 5 is a diagram of the system applied to a linear conveyor; and
FIGURE 6 is a diagram of the multiple station retrieval arrangement of FIGURE 5.

Similar characters of reference indicate similar or identical elements and portions throughout the specification and throughout the views of the drawings.

The system is best used with an endless conveyor which moves at a uniform speed throughout its length. Chain or cable type conveyors are adaptable, but the system is especially effective when applied to a belt conveyor. A belt conveyor can be constructed with a single endless belt around a complex closed circuit, using cornering means such as those described in my U.S. Patent No. 3,095,964 for Means to Guide a Conveyor Belt Around Corners, or Patent No. 3,203,536 for Cornering Roller for Belts.

As illustrated in FIGURE 1, a belt conveyor 10 is arranged in a simple rectangular course with a loading station 12 at one end and a retrieval station 14 at a convenient location on the conveyor. Details of the supporting structure, drive means and the like are omitted, since these are either conventional or as disclosed in the above mentioned U.S. patents. Loading station 12 is provided with means for holding an article at a specific position prior to insertion on the conveyor, such as the platform 16 with a stop 18 against which a typical article 20 is held. Other means such as retractable gates, arms, or the like may be used, as on conventional conveyors which provide for spacing of articles. Retrieval station 14 may have rollers 22, or any other suitable means to carry an ejected article away from the conveyor.

At the loading station 12 is a loader comprising an arm 24 which is momentarily extended by an actuator 26 to push an article from platform 16 on to the conveyor belt. Actuator 26 is triggered, as hereinafter described, by a detector 28 which detects a space on the conveyor belt by photoelectric or other means. Various types of such detectors are presently used on conveyors.

At the retrieval station 14 is an ejector arm 30 pivotally mounted to swing across the conveyor and deflect an article to the chute 32, or similar collecting means. Ejector arm 30 is operated by an actuator 34, which is triggered by means to be described.

Thus far the conveyor is a typical conventional type and may vary considerably in layout and specific operating mechanisms.

The drive for the conveyor is indicated as a drive roller 36 powered by a suitable motor 38, which has a secondary shaft 40 extending to the memory unit 42. In the memory unit 42 are a plurality of rollers 44 spaced to hold an endless loop of magnetic tape 46, comprising the memory element, the length of the loop being a predetermined fraction of the length of the conveyor belt 10. One of the tape supporting rollers is a driven roller 48 driven by secondary shaft 40, the drive ratio being such that the conveyor belt and the tape each make one revolution in synchronization. That is, a particular spot on the tape is always in the same positional relationship to a corresponding spot on the conveyor belt. Other recording mediums may be used, but the magnetic tape is preferable for its durability, ease of handling and the ability to carry a variety of signals which are readily erased or changed.

At one position alongside the tape 46 is a recording head 50, the position corresponding to that of the loading platform 16. At another position alongside the tape is a pickup head 52, the position being spaced along the tape from the recording head 50 at a distance corresponding, in the appropriate scale, to the distance from the loading platform 16 to the ejector arm 30. The heads are multiple track units for accommodating compound signals. As illustrated, the recording head 50 has four recording elements 54 and pick-up head 52 has four corresponding pick-up elements 56.

Data is applied to the tape from an encoding unit 58 containing four banks of tone generators 60, identified as A, B, C and D for convenience, one bank being connected to each recording element 54, through a suitable amplifier 59. Five tone generators are indicated in each bank as an example, but any reasonable number can be used. In each bank the tone generators 60 are selected to provide distinct audio tones, each tone generator being controlled by an individual switch 62. The switches are conveniently arranged on a panel 64 of the encoding unit 58 and may be identified in any suitable manner. Operation of one switch in each bank will thus apply a compound signal of four tones to the tape, as indicated at 66 in FIGURE 4. The tone generators may be electronic, electro-mechanical, or some other suitable type, many being available.

All of the tone generators 60 are connected to a common power supply through a timing switch 68, which is triggered by the detector 28. The timing switch is of the conventional type which, when triggered, passes current for a pre-set time then shuts off. In this instance the period of operation would be on the order of one or two seconds, depending on the speed of the conveyor.

After certain of switches 62 have been operated to encode a signal it is necessary to reset all the switches. If the tone generators 60 are of the type incorporating holding relays, this can be accomplished by a normally closed reset switch 70 in one side of the power supply, the switches 62 then being press type which momentarily energize the holding relays. If the switches are mechanically held the reset switch would be a mechanical release, both arrangements being well known.

Pick-up head 52 is coupled to a decoding unit 72 having a control panel 73 and containing four banks, E, F, G and H, of tone operated relays 74, each responsive to the corresponding tone generator 60 in the encoding unit 58. The tone operated relays 74 may be of the resonant reed type, or have any suitable tone responsive circuitry which will be actuated by a specific tone signal. Each bank of relays 74 is connected through an amplifier 76 to one of the pick-up heads 56. Each relay 74 is individually selected by a switch 78, the relay/switch circuits of each bank being connected in parallel to a power supply through the coil 80 of a switching relay 82. The four switching relays 82 operated by the four banks are connected in series between the power supply and actuator 34, so that all four must be closed to operate the actuator. Thus, one tone operated relay 74 in each bank must be energized by a tone signal to cause actuator 34 to function. Switches 78 are reset by a reset switch 84, which can be mechanical, or electrical as indicated, if the relays 74 incorporate holding circuits. Immediately adjacent the pick-up head 52 is an erasing head 86 positioned to erase a signal from the tape immediately after passing the pick-up head, said erasing head being coupled to the power supply through switching relays 82, so that erasure takes place only when an article is actually removed from the conveyor.

In operation of the conveyor each article 20 is given an identification number, in this instance a four digit number. This can be a catalog number, manufacturer's part number, or a specially coded number relating to the article or its contents. An article is placed on the loading station 12 and the code number is selected on control panel 64 of the encoding unit 58. While the article is held on platform 16 the selected tone generators, one in each bank A, B, C and D, are in a standby condition. As soon as detector 28 senses a space on the conveyor, timing switch 68 is actuated, causing actuator 26 to load the article on the conveyor, as in broken line in FIGURE 1, and simultaneously coupling the selected tone generators 60 to the recording head 50. The four tone code signal representing the particular article is thus impressed on the tape 46 in a position corresponding to the position of the article on the conveyor. Since the conveyor and tape are synchronized this positional relationship does not change. The reset switch 70 is then actuated to clear the encoding unit for subsequent use. A number of articles, each identified in proper position on the tape by a specific coded signal, can be carried by the conveyor and may remain on the conveyor in storage until required. That is, an article need not be removed from the conveyor on its first pass through the retrieval station 14.

When it is desired to retrieve a particular article, that article's identification number is selected on control panel 73 of the decoding unit 72, which is preferably located adjacent the retrieval station 14. The selected tone operated relays 74 are held in standby position until the corresponding signal on the tape 46 passes the pick-up head 52. Only the correct combination of tones will have any effect since only those relays 74 selected are in the circuit. The proper signal will cause all switching relays 82 to close, energizing the actuator 34 and ejecting the article into the retrieving station 14, as indicated in broken line position in FIGURE 1. At the same time erasing head 86 will be operated to erase the signal from the tape, now that the particular article has been removed.

The reset switch 84 is then actuated to clear the decoding unit 72 for subsequent article selection. If, however, it is desired to retrieve all articles of one type, identified by the same coded signal, the control panel 73 may be left as set. As each article of the selected type reaches the retrieval station 14, its coded signal on the tape will cause the actuator 34 to eject the article. By this means any or all articles of a specific type can be retrieved from the conveyor, without the need for repeated selection.

It will be obvious that additional retrieval stations could be incorporated into the conveyor, each with its own decoding unit coupled to a pick-off head located in the memory unit at the appropriate position on the tape. Several decoding units could be set up simultaneously to retrieve different types of articles, since only a specific signal passing a specific pick-up head would cause an article to be ejected from the conveyor.

The multiple station arrangement is also adaptable to a linear endless conveyor, as in FIGURES 5 and 6. The conveyor is illustrated as having an endless belt 90 supported in any suitable manner and operated by a drive roller 92 driven by a motor 94, which also drives a synchronized endless tape 96 in a memory unit 98. At the end of the conveyor adjacent the memory unit is a loading station 100, with an encoding unit 102 which is coupled to a recording head 104 in the memory unit. Encoding unit 102 is triggered by a detector 106, which detects the passage of an article 108 placed on the belt 90 and impresses the appropriate signal on the tape.

At certain positions along the belt are retrieval stations 110, three being indicated as an example. Each retrieval station has a decoding unit 112 coupled to a pick-up head 114 in the memory unit 98, the pick-up heads being located along the tape 96 in positions corresponding to their locations along the belt. Each retrieval station 110 also has an ejector 116 triggered by passage of an appropriate signal past the associated pick-up head 114 to eject an article at that retrieval station. The circuitry and operation are as described above.

With the linear conveyor the articles cannot remain on the conveyor but are delivered from the loading station direct to the required retrieval station as needed. In a very long conveyor each retrieval station could have remote indicating means to notify an operator at the loading station of the particular needs. Various types of signal light systems are well known and, in the present system, the actual selector switches on the decoding unit could be used to operate remote lights to indicate the selected code of an article required at a specific station.

The conveyor structure, whether belt, chain, or other type, and the specific article handling apparatus are immaterial, as long as the load carrying element is endless, or at least constructed in such a manner as to be closely synchronized with an endless recording element. The tape, or equivalent recording medium, represents the entire memory for the system and carries the data in a form and in a location for immediate retrieval at the required time.

It is understood that minor variation from the form of the invention disclosed herein may be made without departure from the spirit and scope of the invention, and that the specification and drawings are to be considered as merely illustrative rather than limiting.

What is claimed is:

1. In combination with an endless conveyor a system adapted to circulate articles supported thereon in an endless path and having drive means, an article loading station, and at least one article retrieval station, the improvement of a memory system, comprising:
   a memory unit having an endless recording element of a length proportional to the length of the conveyor, with means coupled to said drive means to drive the recording element in synchronization with the conveyor, whereby the recording element and the conveyor each make a complete revolution in the same time;
   an encoding unit having recording means to apply a predetermined signal to the recording element at a first position corresponding to the location of said loading station;
   switch means, operable simultaneously with placement of an article on said conveyor at the loading station, to actuate said recording means;
   a selectively operable manually actuated decoding unit having pick-up means responsive only to the predetermined recorded signal at a position on said recording element corresponding to the location of said retrieval station;
   and ejection means at said retrieval station coupled to said decoding unit responsive to the signal picked up by said decoding unit to eject an article from the conveyor and move the article to said retrieval station upon receipt of the predetermined signal.

2. The combination according to claim 1, and including a loading platform at said loading station;
   loading means at said platform for loading an article from the platform onto said conveyor;
   detector means for sensing the presence of space for an article on the conveyor;
   said detector means being coupled to said switch means, and said switch means coupled to said loading means and said encoding unit to operate the loading means and the decoding unit simultaneously upon operation of the detector means.

3. The combination according to claim 1, and including a plurality of retrieval stations at spaced distances along the conveyor from said loading station;
   a decoding unit at each of said retrieval stations and having an ejection means coupled thereto;
   a plurality of pick-up means disposed along said recording element at proportional distances from said first position, corresponding to the distances of the retrieval stations from the loading station, each of said pick-up means being connected to the decoding unit at the respective retrieval station.

4. The combination according to claim 1, wherein said encoding unit includes a plurality of discrete signal generating means, with selection means to select at least one signal generating means for operation;
   said decoding unit including a plurality of signal responsive means each responsive to a signal from one of said signal generating means, with selection means to select at least one signal responsive means for operation.

5. The combination according to claim 4, wherein said signal generating means are arranged in a plurality of banks, said recording means having multiple recording elements each connected to one of said banks;
   said signal responsive means being arranged in banks corresponding to said signal generating means, and said pick-up means having multiple pick-up elements each connected to one bank of signal responsive means in corresponding relation to said recording elements.

6. The combination of claim 5, wherein said banks of signal responsive means are connected in series to said ejection means, whereby a signal responsive means in each bank must operate simultaneously to actuate said ejection means.

References Cited

UNITED STATES PATENTS

| | | | |
|---|---|---|---|
| 2,427,057 | 9/1947 | Knox | 198—38 |
| 2,728,466 | 12/1955 | Postlewaite et al. | 214—38 |
| 2,825,476 | 3/1958 | Muller | 214—38 |
| 2,984,366 | 5/1961 | Greller | 214—38 |
| 3,075,653 | 1/1963 | Wales et al. | 214—38 |
| 3,144,948 | 8/1964 | Henig | 214—38 |
| 3,312,358 | 4/1967 | Atanasoff et al. | 214—38 |

ROBERT G. SHERIDAN, *Primary Examiner.*

R. B. JOHNSON, *Assistant Examiner.*